United States Patent
Tsuruta et al.

(10) Patent No.: US 9,732,208 B2
(45) Date of Patent: Aug. 15, 2017

(54) POLYETHYLENE RESIN COMPOSITION, LAMINATE COMPRISING SAME, AND MEDICAL CONTAINER USING LAMINATE

(71) Applicant: TOSOH CORPORATION, Shunan-shi, Yamaguchi (JP)

(72) Inventors: Akeharu Tsuruta, Yokkaichi (JP); Shinpei Hama, Yokkaichi (JP); Yoshiyuki Moro, Yokkaichi (JP)

(73) Assignee: TOSOH CORPORATION, Shunan-shi, Yamaguchi (JP)

( * ) Notice: Subject to any disclaimer, the term of this patent is extended or adjusted under 35 U.S.C. 154(b) by 0 days.

(21) Appl. No.: 15/027,115

(22) PCT Filed: Oct. 8, 2014

(86) PCT No.: PCT/JP2014/076984
§ 371 (c)(1),
(2) Date: Apr. 4, 2016

(87) PCT Pub. No.: WO2015/053334
PCT Pub. Date: Apr. 16, 2015

(65) Prior Publication Data
US 2016/0237263 A1 Aug. 18, 2016

(30) Foreign Application Priority Data
Oct. 10, 2013 (JP) .................. 2013-213046

(51) Int. Cl.
| | | |
|---|---|---|
| C08L 23/06 | (2006.01) | |
| A61J 1/10 | (2006.01) | |
| B32B 27/32 | (2006.01) | |
| B32B 27/08 | (2006.01) | |
| A61J 1/14 | (2006.01) | |
| B65D 65/40 | (2006.01) | |

(52) U.S. Cl.
CPC .............. *C08L 23/06* (2013.01); *A61J 1/10* (2013.01); *A61J 1/1468* (2015.05); *B32B 27/08* (2013.01); *B32B 27/32* (2013.01); *B65D 65/40* (2013.01); *B32B 2270/00* (2013.01); *B32B 2307/412* (2013.01); *B32B 2307/546* (2013.01); *B32B 2307/7242* (2013.01); *B32B 2307/7244* (2013.01); *B32B 2307/7246* (2013.01); *B32B 2439/40* (2013.01); *B32B 2439/80* (2013.01)

(58) Field of Classification Search
CPC . C08L 23/06; A61J 1/1468; A61J 1/10; B32B 27/08; B32B 27/32; B32B 2270/00; B32B 2307/412; B32B 2307/546; B32B 2307/7242; B32B 2307/7244; B32B 2439/40; B32B 2439/80; B65D 65/40
See application file for complete search history.

(56) References Cited

U.S. PATENT DOCUMENTS 5,714,547 A * 2/1998 Li et al. .................. C08J 5/18
525/240

FOREIGN PATENT DOCUMENTS

| JP | 11-170411 A | 6/1999 |
|---|---|---|
| JP | 2004-231844 A | 8/2004 |
| JP | 2012-126862 A | 7/2012 |
| JP | 2012-136665 A | 7/2012 |

OTHER PUBLICATIONS

International Search Report for PCT/JP2014/076984 dated Dec. 16, 2014.

* cited by examiner

*Primary Examiner* — Nathan M Nutter
(74) *Attorney, Agent, or Firm* — Sughrue Mion, PLLC

(57) ABSTRACT

Provided are: a polyethylene laminate that exhibits excellent flexibility, barrier properties, and cleanliness (a low occurrence of fine particles), that does not deform even after sterilization treatment at 121° C., and that maintains high transparency; and a medical container using same. The medical container is configured by layering: an outer layer and an inner layer that comprise from 20 to 80 wt % of a high-density polyethylene (A) having specific properties, from 0 to 50 wt % of a linear low-density polyethylene (B1), and from 5 to 40 wt % of an ethylene-based polymer (C); and an intermediate layer that comprises from 10 to 40 wt % of the high-density polyethylene (A) and from 60 to 90 wt % of the linear low-density polyethylene (B1).

14 Claims, No Drawings

POLYETHYLENE RESIN COMPOSITION, LAMINATE COMPRISING SAME, AND MEDICAL CONTAINER USING LAMINATE

CROSS REFERENCE TO RELATED APPLICATIONS

This application is a National Stage of International Application No. PCT/JP2014/076984 filed Oct. 8, 2014, claiming priority based on Japanese Patent Application No. 2013-213046, filed Oct. 10, 2013, the contents of all of which are incorporated herein by reference in their entirety.

TECHNICAL FIELD

The present invention relates to a polyethylene resin composition, a laminate comprising the same, and a medical container which uses the laminate. In further detail, the present invention relates to a polyethylene resin composition which exhibits little container deformation and decrease in transparency due to sterilization treatment, has excellent barrier properties against permeation of water vapor, oxygen, and the like, and little elution of particles into the drug solution. Therefore, the present invention relates to a polyethylene composition, which is advantageous for medical containers filled with drug solutions, blood, and the like such as an infusion bag or plastic ampoule, a laminate comprising the same, and a medical container that uses the laminate.

BACKGROUND ART

Medical containers filled with drug solutions, blood, or the like require transparency in order to check changes due to contamination by impurities or blending of drug solutions, heat resistance to withstand sterilization treatment, flexibility to facilitate dispensing of drug solutions, gas barrier properties to suppress degeneration or a decrease in quality of drug solutions and the like due to permeation of water vapor or oxygen into the container, reduced fine particle elution from the container (low occurrence of fine particles), and the like.

Conventionally, glass containers have been used as medical containers having satisfactory performance with regard to these requirements. However, since there are problems such as container damage due to impact or being dropped and contamination due to infiltration of external gas into the container during administration of the drug solution, plastic containers which have excellent impact resistance, are flexible, and facilitate dispensing of the contents have come to be used. For such plastic containers, soft vinyl chloride resin, ethylene-vinyl acetate copolymer resin, polypropylene resin, and polyethylene resins such as high-pressure low-density polyethylene, linear low-density polyethylene, and high-density polyethylene have been used. However, soft vinyl chloride resin has problems in hygiene such as the plasticizer eluting into the drug solution, ethylene-vinyl acetate copolymer resin has the problem of lacking heat resistance, and polypropylene resin has problems in flexibility and cleanliness (low occurrence of fine particles). Furthermore, polyethylene resins have the problems that heat resistance, gas barrier properties, and the like decrease if the density is lowered to achieve satisfactory transparency and flexibility and cleanliness may further deteriorate.

Linear polyethylene produced with a single-site type catalyst having excellent transparency has been recently developed, and methods for solving the above problems by laminating film that uses it as a raw material have been proposed (refer to Patent Documents 1 to 3). However, transparency is still insufficient in these laminates, and the impact strength of the heat seal portion and the like of a molded container is not considered sufficient, and therefore improvements have been desired.

Additionally, a method has been proposed for obtaining a container in which deformation and wrinkling do not occur even after sterilization treatment at 121° C. and the strength of the seal portion is excellent by laminating an inner layer, an intermediate layer, and an outer layer constructed from material containing a polyethylene resin having certain physical properties (refer to Patent Document 4). Although this method certainly makes it possible to retain high seal strength even after sterilization treatment, it does not solve the problem that container transparency decreases after sterilization treatment, and improvements have been desired.

Additionally, a method has been proposed wherein a laminate for an infusion bag having heat resistance capable of withstanding sterilization at 124° C. is obtained by blending a certain amount of a crystal nucleus agent in an intermediate layer disposed between an outer layer and an inner layer (refer to Patent Document 5). However, even this method still does not solve the problem that transparency decreases due to sterilization treatment.

CITATION LIST

Patent Literature

Patent Document 1: Japanese Unexamined Patent Application Publication No. H08-309939A
Patent Document 2: Japanese Unexamined Patent Application Publication No. H07-125738A
Patent Document 3: Japanese Unexamined Patent Application Publication No. H08-244791A
Patent Document 4: Japanese Unexamined Patent Application Publication No. 3964210A
Patent Document 5: Japanese Unexamined Patent Application Publication No. 2012-85742A

SUMMARY OF INVENTION

Technical Problem

An object of the present invention is to provide a polyethylene resin composition which has excellent heat resistance, flexibility, barrier properties, and cleanliness (low occurrence of fine particles), and does not deform and retains high transparency even after sterilization treatment at 121° C., which are shortcomings of conventional plastic containers, and to provide a laminate comprising the same and a medical container which uses the laminate.

Solution to Problem

As a result of diligent research, the present inventors discovered that the above problems can be solved by laminating an outer layer, an inner layer, and an intermediate layer comprising polyethylene resin compositions in which polyethylene resins having certain physical properties have been blended in certain amounts, and they thereby achieved the present invention.

Specifically, the present invention exists in the following [1] to [14].

[1] A polyethylene resin composition comprising from 20 to 80 wt % of a high-density polyethylene (A) satisfying below-mentioned characteristics (a) and (b), from 0 to 50 wt % of a linear low-density polyethylene (B1) satisfying below-mentioned characteristics (c) and (d), and from 5 to 40 wt % of an ethylene-based polymer satisfying below-mentioned characteristics (e) to (h), a total of (A), (B1), and (C) being 100 wt %:

(a) Density is from 945 to 970 kg/m$^3$;
(b) MFR is from 0.1 to 15.0 g/10 min;
(c) Density is from 890 to 915 kg/m$^3$;
(d) MFR is from 0.1 to 15.0 g/10 min;
(e) Density is from 930 to 960 kg/m$^3$;
(f) MFR is from 0.1 to 15.0 g/10 min;
(g) Two peaks appear in molecular weight measurement by gel permeation chromatography, and a ratio (Mw/Mn) of weight-average molecular weight (Mw) to number-average molecular weight (Mn) is from 2.0 to 7.0;
(h) A fraction having Mn of not less than 100,000 obtained by molecular-weight fractionation has 0.15 or more long-chain branches per 1,000 carbons of a main chain.

[2] The polyethylene resin composition according to the above [1], wherein the high-density polyethylene (A) satisfies below-mentioned characteristics (i) and (j) in addition to the above characteristics (a) and (b):

(i) A ratio (Mw/Mn) of weight-average molecular weight (Mw) to number-average molecular weight (Mn) determined by gel permeation chromatography is not greater than 3.0;
(j) Residue according to the Residue on Ignition Test set forth in the Japanese Pharmacopoeia is not greater than 0.02 wt %.

[3] The polyethylene resin composition according to the above [1] or [2], wherein the linear low-density polyethylene (B1) satisfies below-mentioned characteristics (k) and (l) in addition to the above characteristics (c) and (d):

(k) A ratio (Mw/Mn) of weight-average molecular weight (Mw) to number-average molecular weight (Mn) determined by gel permeation chromatography is not greater than 3.0;
(l) An n-heptane extraction quantity at 50° C. is not greater than 1.5 wt %.

[4] The polyethylene resin composition according to any one of the above [1] to [3], wherein Mw/Mn of the ethylene-based polymer (C) is from 3.0 to 6.0, and Mn is not less than 15,000.

[5] The polyethylene resin composition according to any one of the above [1] to [4], wherein a proportion of components of the ethylene-based polymer (C) of which Mn is not less than 100,000 when fractioned by molecular weight is less than 40% of all of the ethylene-based polymer (C).

[6] The polyethylene resin composition according to any one of the above [1] to [5], wherein the composition comprises from 20 to 70 wt % of the high-density polyethylene (A), from 10 to 50 wt % of the linear low-density polyethylene (B1), and from 5 to 40 wt % of the ethylene-based polymer (C).

[7] A laminate containing an outer layer, an inner layer, and an intermediate layer disposed therebetween, the outer layer and the inner layer comprising the polyethylene resin composition described in any one of the above [1] to [6], the intermediate layer comprising from 10 to 40 wt % of the high-density polyethylene (A) satisfying at least the above characteristics (a) and (b) and from 60 to 90 wt % of the linear low-density polyethylene (B1) satisfying the above characteristics (c) and (d), a total of (A) and (B1) being 100 wt %.

[8] The laminate according to the above [7], wherein the high-density polyethylene (A) used in the intermediate layer satisfies the above characteristics (a), (b), (i) and (j).

[9] The laminate according to the above [7], wherein the linear low-density polyethylene (B1) used in the intermediate layer satisfies the above characteristics (c), (d), (k) and (l).

[10] The laminate according to any one of the above [7] to [9], wherein the intermediate layer comprises a resin composition containing from 5 to 30 wt % of a linear low-density polyethylene (B2) satisfying below-mentioned characteristics (m) and (n) relative to a total of 100 wt % of the high-density polyethylene (A) and the linear low-density polyethylene (B1):

(m) Density is from 920 to 945 kg/m$^3$;
(n) MFR is from 0.1 to 15.0 g/10 min.

[11] A medical container possessing a holding portion which holds a drug solution, at least the holding portion comprising the laminate described in any one of the above [7] to [10].

[12] The medical container according to the above [11], wherein the holding portion which holds a drug solution is formed by molding a laminate molded in a film shape into a bag shape by hot sheet molding.

[13] The medical container according to the above [11], wherein the holding portion which holds a drug solution is formed by molding a laminate into a bottle shape by blow molding.

[14] The medical container according to any one of the above [11] to [13], wherein, even after sterilization treatment at 121° C., there is no deformation of the container and light transmittance measured at wavelength 450 nm in purified water is not less than 70%.

The blending proportions of the high-density polyethylene (A), the linear low-density polyethylene (B1), and the ethylene-based polymer (C) are such that the high-density polyethylene (A) is from 20 to 80 wt %, preferably from 25 to 75 wt %, and more preferably from 30 to 70 wt %, the linear low-density polyethylene (B1) is from 0 to 50 wt %, preferably from 5 to 45 wt %, and more preferably from 10 to 40 wt %, and the ethylene-based polymer (C) is from 5 to 40 wt %, and preferably from 10 to 30 wt %. When the high-density polyethylene (A) is less than 20 wt %, it is unfavorable because heat resistance is unsatisfactory, and when greater than 80 wt %, it is unfavorable because transparency decreases. When the linear low-density polyethylene (B1) is greater than 50 wt %, it is unfavorable because heat resistance is unsatisfactory. When the ethylene-based polymer (C) is less than 5 wt %, it is unfavorable because melt tension is unsatisfactory and molding stability decreases, and when greater than 40 wt %, it is unfavorable because heat resistance is unsatisfactory and because the smoothness of the surface of the obtained laminate is adversely affected.

The blending proportions of the high-density polyethylene (A), the linear low-density polyethylene (B1), and the ethylene-based polymer (C) may be the same or different in the outer layer and the inner layer as long as they are in the ranges given above.

In the inner layer and the outer layer of the laminate pertaining to the present invention, when the ethylene-based polymer (C) is blended within the range given above, a higher level of transparency can be maintained even after sterilization treatment compared to when the ethylene-based polymer (C) is not blended. The reason that such a benefit manifests is not necessarily clear, but it has been confirmed that the size of spherulites formed during cold crystallization is greatly reduced by blending the ethylene-based polymer (C), and it is thought that the ethylene-based polymer (C)

has an effect of hindering spherulite growth in the course of molding and in the course of sterilization treatment.

In the intermediate layer of the laminate pertaining to the present invention, the blending proportions of the high-density polyethylene (A) and the linear low-density polyethylene (B1) are such that the high-density polyethylene (A) is from 10 to 40 wt %, preferably from 15 to 35 wt %, and more preferably from 20 to 30 wt %, and the linear low-density polyethylene (B1) is from 60 to 90 wt %, preferably from 65 to 85 wt %, and more preferably from 70 to 80 wt %.

When the high-density polyethylene (A) is less than 10 wt % (that is, when the linear low-density polyethylene (B1) is greater than 90 wt %), it is unfavorable because heat resistance decreases and deformation or a decrease in transparency of the container occur after sterilization treatment at 121° C. When the high-density polyethylene (A) is greater than 40 wt % (that is, when the linear low-density polyethylene (B1) is less than 60 wt %), it is unfavorable because the flexibility and transparency of the obtained laminate decrease.

Furthermore, when the linear low-density polyethylene (B2) satisfying the below-mentioned characteristics (m) and (n) is in the range from 5 to 30 parts by weight relative to a total of 100 parts by weight of the high-density polyethylene (A) and the linear low-density polyethylene (B1) used in the intermediate layer, it is preferred because transparency can be further increased while maintaining heat resistance.

(m) Density is from 920 to 945 kg/m$^3$;
(n) MFR is from 0.1 to 15.0 g/10 min.

The polyethylene resin, resin composition, laminate comprising the same, and medical container using the laminate pertaining to the present invention will be described below.

[1] High-Density Polyethylene (A)

The high-density polyethylene (A) used in the present invention is an ethylene homopolymer or a copolymer of ethylene and α-olefin.

The high-density polyethylene (A) pertaining to the present invention has a melt flow rate (referred to as "MFR" hereinafter) of 0.1 to 15.0 g/10 min, preferably from 0.5 to 10.0 g/10 min, and more preferably from 1.0 to 5.0 g/10 min, when measured at 190° C. and load of 2.16 kg in conformance with JIS K6922-1. When the MFR is less than 0.1 g/10 min, it is unfavorable because the load on the extruder during the molding process is high and surface roughening occurs during molding. When the MFR is greater than 15.0 g/10 min, it is unfavorable because melt tension is low and molding stability decreases.

The high-density polyethylene (A) pertaining to the present invention has a density of 945 to 970 kg/m$^3$, and preferably from 950 to 965 kg/m$^3$, as measured in conformance with JIS K6922-1. When the density is less than 945 kg/m$^3$, it is unfavorable because heat resistance is unsatisfactory in that container deformation occurs due to 121° C. sterilization treatment, and when greater than 970 kg/m$^3$, it is unfavorable because transparency and flexibility decrease.

The high-density polyethylene (A) pertaining to the present invention may be produced by production methods such as, for example, the slurry method, the solution method, and the gas phase method. The high-density polyethylene (A) may be produced, in general, by homopolymerizing ethylene or copolymerizing ethylene and α-olefin using a Ziegler catalyst comprising a solid catalyst component containing magnesium and titanium, and an organoaluminum compound; a metallocene catalyst comprising an organic transition metal compound containing a cyclopentadienyl derivative, and a compound that reacts with the organic transition metal compound to form an ionic complex and/or an organometallic compound; a vanadium-type catalyst; or the like.

The high-density polyethylene (A) having the above characteristics, by being blended with the linear low-density polyethylene (B1) and the ethylene-based polymer (C) described later, exhibits the benefits of improved transparency and maintaining transparency after sterilization treatment of an obtained medical container, but when the high-density polyethylene (A) has the following characteristics (i) and (j), it is particularly preferred because cleanliness (low occurrence of fine particles) and transparency after sterilization treatment of the medical container of the present invention are further improved. The high-density polyethylene (A) having such characteristics (i) and (j) may be produced using the above metallocene catalyst.

(i) The ratio (Mw/Mn) of weight-average molecular weight (Mw) to number-average molecular weight (Mn) determined by gel permeation chromatography is not greater than 3.0.

(j) Residue according to the Residue on Ignition Test set forth in the Japanese Pharmacopoeia is not greater than 0.02 wt %.

The high-density polyethylene (A) pertaining to the present invention may be one obtained as a commercially available product, examples of which include brand names Nipolon Hard 5700, Nipolon Hard 8500, Nipolon Hard 8022, and the like, all manufactured by Tosoh Corporation.

The high-density polyethylene (A) pertaining to the present invention may also be produced by the following production methods. For example, it may be produced by homopolymerizing ethylene or copolymerizing ethylene and α-olefin using a metallocene catalyst comprising an organic transition metal compound containing a cyclopentadienyl derivative, and a compound that reacts with the organic transition metal compound to form an ionic complex and/or an organometallic compound using a production method such as the slurry method, solution method, or gas phase method, according to methods described in Japanese Unexamined Patent Application Publication Nos. 2009-275059 and 2013-81494A.

As the α-olefin, substances generally called α-olefins may be used, and α-olefins having from 3 to 12 carbons such as propylene, butene-1, hexene-1, octene-1,4-methyl-1-pentene, and the like are preferred. Examples of copolymers of ethylene and α-olefin include ethylene-hexene-1 copolymer, ethylene.butene-1 copolymer, ethylene.octene-1 copolymer, and the like.

[2] Linear Low-Density Polyethylene (B1)

The linear low-density polyethylene (B1) used in the present invention is a copolymer of ethylene and α-olefin.

The linear low-density polyethylene (B1) pertaining to the present invention has an MFR of 0.1 to 15.0 g/10 min, preferably from 0.5 to 10.0 g/10 min, and more preferably from 1.0 to 5.0 g/10 min, when measured at 190° C. and load of 2.16 kg in conformance with JIS K6922-1. When the MFR is less than 0.1 g/10 min, it is unfavorable because the extrusion load during the molding process is high and surface roughening occurs during molding. When the MFR is greater than 15.0 g/10 min, it is unfavorable because melt tension is low and molding stability decreases.

The linear low-density polyethylene (B1) pertaining to the present invention has a density of 890 to 915 kg/m$^3$, and preferably from 895 to 910 kg/m$^3$, as measured in conformance with JIS K6922-1. When the density is less than 890 kg/m$^3$, it is unfavorable because heat resistance is unsatisfactory, and when greater than 915 kg/m$^3$, it is unfavorable because transparency and flexibility decrease.

The linear low-density polyethylene (B1) pertaining to the present invention may be produced by production methods such as, for example, the high-pressure method, the solution method, and the gas phase method. The linear low-density polyethylene (B1) may be produced, in general, by copolymerizing ethylene and α-olefin using a Ziegler catalyst comprising a solid catalyst component containing magnesium and titanium, and an organoaluminum compound; a metallocene catalyst comprising an organic transition metal compound containing a cyclopentadienyl derivative, and a compound that reacts with the organic transition metal compound to form an ionic complex and/or an organometallic compound; a vanadium-type catalyst; or the like.

The linear low-density polyethylene (B1) having the above characteristics, by being blended with the high-density polyethylene (A) described above and the ethylene-based polymer (C) described later, exhibits the benefits of improving transparency and maintaining transparency after sterilization treatment of an obtained medical container, but when the linear low-density polyethylene (B1) has the following characteristics (k) and (l), it is particularly preferred because cleanliness (low occurrence of fine particles) and transparency after sterilization treatment of the medical container of the present invention are further improved. The linear low-density polyethylene (B1) having such characteristics (k) and (l) may be produced using the above metallocene catalyst.

(k) The ratio (Mw/Mn) of weight-average molecular weight (Mw) to number-average molecular weight (Mn) determined by gel permeation chromatography is not greater than 3.0.

(l) The n-heptane extraction quantity at 50° C. is not greater than 1.5 wt %.

The linear low-density polyethylene (B1) pertaining to the present invention may be one obtained as a commercially available product, examples of which include brand names Nipolon-Z HF212R, Nipolon-Z HF210K, Nipolon-Z ZF220, and the like, all manufactured by Tosoh Corporation.

The linear low-density polyethylene (B1) pertaining to the present invention may also be produced by the following production methods. For example, it may be produced by copolymerizing ethylene and α-olefin using a metallocene catalyst comprising an organic transition metal compound containing a cyclopentadienyl derivative, and a compound that reacts with the organic transition metal compound to form an ionic complex and/or an organometallic compound, using a production method such as the high-pressure method, solution method, or gas phase method, according to methods described in Japanese Unexamined Patent Application Publication Nos. 2009-275059A and 2013-81494A.

As the α-olefin, substances generally called α-olefins may be used, and α-olefins having from 3 to 12 carbons such as propylene, butene-1, hexene-1, octene-1,4-methyl-1-pentene, and the like are preferred. Examples of copolymers of ethylene and α-olefin include ethylene.hexene-1 copolymer, ethylene.butene-1 copolymer, ethylene.octene-1 copolymer, and the like.

[3] Ethylene-Based Polymer (C)

The ethylene-based polymer (C) pertaining to the present invention has an MFR of 0.1 to 15.0 g/10 min, preferably from 0.5 to 10.0 g/10 min, and more preferably from 1.0 to 5.0 g/10 min, when measured at 190° C. and load of 2.16 kg in conformance with JIS K6922-1. When the MFR is less than 0.1 g/10 min, it is unfavorable because the extrusion load during the molding process is high and surface roughening occurs during molding. When the MFR is greater than 15.0 g/10 min, it is unfavorable because melt tension is low and processing stability during molding decreases.

The ethylene-based polymer (C) pertaining to the present invention has a density of 930 to 960 kg/m$^3$, preferably from 935 to 955 kg/m$^3$, and particularly preferably from 940 to 950 kg/m$^3$, as measured in conformance with JIS K6922-1. When the density is less than 930 kg/m$^3$, it is unfavorable because heat resistance is unsatisfactory, and when greater than 960 kg/m$^3$, it is unfavorable because transparency and flexibility decrease.

The ethylene-based polymer (C) pertaining to the present invention exhibits two peaks in molecular weight measurement by gel permeation chromatography (referred to as "GPC" hereinafter). For peak top molecular weight (Mp), the molecular weight distribution curve obtained by GPC measurement was divided into two peaks by a method to be described later, and the top molecular weights of the peak on the high molecular weight side and the peak on the low molecular weight side were evaluated, and when the difference between them was not less than 100,000, it was considered to have two peak top molecular weights. When less than 100,000, the top molecular weight of the actually measured molecular weight distribution curve was considered to be one Mp.

The method of dividing the molecular weight distribution curve was as follows. A synthesized curve was created by combining, in any proportion, two logarithmic distribution curves having a standard deviation of 0.3 and any average value (molecular weight of peak top position) with respect to Log M of a molecular distribution curve, in which weight proportion is plotted against log M (the logarithm of molecular weight) obtained by GPC measurement. Furthermore, the average value and proportion were determined so as to minimize the sum of squared deviation of weight proportion relative to the same molecular weight (M) value of the actually measured molecular weight distribution curve and the synthesized curve. The minimum of the sum of squared deviation was set to not greater than 0.5% relative to the sum of squared deviation when the proportions of the peaks were all 0. When the average and the proportion that give the minimum sum of squared deviation were obtained, the molecular weight at the peak top of the respective logarithmic distribution curves obtained by dividing the curve into two log-normal distribution curves was taken as Mp.

When an ethylene-based polymer having one peak in molecular weight measurement by GPC is used as one component for obtaining the polyethylene resin composition of the present invention, a medical container that has high transparency and maintains transparency after sterilization treatment is not obtained as it is obtained when the ethylene-based polymer (C) having two peaks is blended.

The ethylene-based polymer (C) pertaining to the present invention has a ratio (Mw/Mn) of weight-average molecular weight (Mw) to number-average molecular weight (Mn) from 2.0 to 7.0, preferably from 2.5 to 6.5, and more preferably from 3.0 to 6.0. When Mw/Mn is less than 2.0, it is unfavorable because not only is the extrusion load during the molding process high, but the appearance (surface texture) of the obtained medical container is also adversely affected.

When Mw/Mn is greater than 7.0, not only does the strength of the obtained medical container decrease, but there is risk of the number of fine particles in the contained drug solution increasing when used as a medical container.

The ethylene-based polymer (C) pertaining to the present invention has a number-average molecular weight (Mn) measured by GPC of preferably not less than 15,000, more preferably from 15,000 to 100,000, and particularly preferably from 15,000 to 50,000. When Mn is not less than 15,000, the strength of the obtained medical container is high.

In the ethylene-based polymer (C) pertaining to the present invention, the fraction having Mn of not less than 100,000 obtained by molecular-weight fractionation has 0.15 or more long-chain branches per 1,000 carbons of the main chain. When the fraction having Mn of not less than 100,000 has less than 0.15 long-chain branches per 1,000 carbons, a remarkable benefit of improving transparency and a benefit of maintaining transparency after sterilization treatment are not obtained when the ethylene-based polymer is used as one component for obtaining the polyethylene resin composition of the present invention.

In the ethylene-based polymer (C) pertaining to the present invention, the proportion of the fraction having Mn of not less than 100,000 obtained by molecular-weight fractionation is preferably less than 40% of all of ethylene-based polymer (C). When the proportion of the fraction having Mn of not less than 100,000 obtained by molecular-weight fractionation is less than 40% of all of the ethylene-based polymer (C), the extrusion load during the molding process is small, and the appearance (surface texture) of the obtained medical container is good.

It was established above that when ethylene-based polymer (C) is blended within the above range in the inner and outer layers of the polyethylene laminate pertaining to the present invention, molding stability during production of the laminate improves, and further, the obtained medical container has excellent gas barrier properties and cleanliness (low occurrence of fine particles), and maintains a high level of transparency even after sterilization treatment at 121° C.

The ethylene-based polymer (C) pertaining to the present invention may be obtained by methods described in, for example, Japanese Unexamined Patent Application Publication Nos. 2012-126862A, 2012-126863A, 2012-158654A, 2012-158656A, 2013-28703A, and the like. Furthermore, as a commercially available product, brand names TOSOH-HMS CK37 and CK47 (both manufactured by Tosoh Corporation) and the like may be used.

[4] Linear Low-Density Polyethylene (B2)

The linear low-density polyethylene (B2) used in the present invention is a copolymer of ethylene and α-olefin.

The linear low-density polyethylene (B2) pertaining to the present invention has an MFR of 0.1 to 15.0 g/10 min, preferably from 0.5 to 10.0 g/10 min, and more preferably from 1.0 to 5.0 g/10 min, when measured at 190° C. and load of 2.16 kg in conformance with JIS K6922-1.

The linear low-density polyethylene (B2) pertaining to the present invention has a density of 920 to 945 kg/m$^3$, and preferably from 925 to 940 kg/m$^3$, as measured in conformance with JIS K6922-1.

The linear low-density polyethylene (B2) pertaining to the present invention may be produced by a production method such as the high-pressure method, the solution method, or the gas phase method. For example, it may be produced by copolymerizing ethylene and α-olefin using a Ziegler catalyst comprising a solid catalyst component containing magnesium and titanium, and an organoaluminum compound; a metallocene catalyst comprising an organic transition metal compound containing a cyclopentadienyl derivative, and a compound that reacts with the organic transition metal compound to form an ionic complex and/or an organometallic compound; a vanadium-type catalyst; or the like.

As the α-olefin, substances generally called α-olefins may be used, and α-olefins having from 3 to 12 carbons such as propylene, butene-1, hexene-1, octene-1,4-methyl-1-pentene, and the like are preferred. Examples of copolymers of ethylene and α-olefin include ethylene.hexene-1 copolymer, ethylene.butene-1 copolymer, ethylene.octene-1 copolymer, and the like.

The linear low-density polyethylene (B2) pertaining to the present invention may be one obtained as a commercially available product, examples of which include brand names Nipolon-Z ZF220, Nipolon-Z ZF230, and Nipolon-L F14, all manufactured by Tosoh Corporation.

It may also be produced by the following production methods. For example, it may be produced by copolymerizing ethylene and an α-olefin having from 3 to 8 carbons in the presence of the polymerization catalyst described in Japanese Unexamined Patent Application Publication No. 2013-81494A or the like.

[5] Polyethylene Resin Composition

The polyethylene resin composition of the present invention may be obtained by mixing the above-described high-density polyethylene (A), linear low-density polyethylenes (B1) and (B2), and ethylene-based polymer (C) using, for example, a Henschel mixer, a V-blender, a ribbon blender, a tumbler blender, or the like, or, by further melt-kneading the mixture obtained by such a method using a single-screw extruder, a twin-screw extruder, a kneader, a Banbury mixer, or the like, and then granulating.

When the resin composition used in the production of the outer layer and the inner layer that constitute the laminate of the present invention has an MFR in the range of 1.0 to 5.0 and density in the range of 925 to 950 kg/m$^3$, it is more preferred because molding stability is good and the balance of flexibility and film appearance after sterilization treatment at 121° C. is particularly excellent. The resin composition used in the production of the intermediate layer that constitutes the laminate of the present invention preferably has an MFR in the range of 1.0 to 5.0 and density in the range of 910 to 925 kg/m$^3$, because molding stability is good and the balance of flexibility and transparency after sterilization treatment is particularly excellent.

In the polyethylene resin composition of the present invention, known additives used in general may be blended as appropriate and as necessary in a range such that they do not markedly diminish the advantageous benefits of the invention. Examples of such additives include antioxidants, neutralizers, antistatic agents, lubricants, antiblocking agents, antihaze agents, organic or inorganic pigments, ultraviolet absorbing agents, dispersants, and the like. The method for blending the above additives in the resin composition pertaining to the present invention is not particularly limited, but examples include direct addition in the pellet granulation step after polymerization, or producing a high-concentration master batch in advance and then dry blending at the time of molding.

Additionally, other thermoplastic resins such as high-pressure low-density polyethylene, ethylene.propylene copolymer rubber, poly-1-butene, and the like may be blended in the polyethylene resin composition of the present invention within a range such that they do not diminish the advantageous benefits of the present invention.

[6] Laminate

The laminate of the present invention contains an outer layer, an inner layer, and an intermediate layer disposed therebetween. The outer layer and the inner layer are made from a resin composition containing from 20 to 80 wt % of the high-density polyethylene (A) satisfying the below-mentioned characteristics (a) and (b), from 0 to 50 wt % of the linear low-density polyethylene (B1) satisfying the below-mentioned characteristics (c) and (d), and from 5 to 40 wt % of the ethylene-based polymer (C) satisfying the below-mentioned characteristics (e) to (h) (where the total of (A), (B1), and (C) is 100 wt %). The intermediate layer is made from, at least, a resin composition containing from 10 to 40 wt % of the high-density polyethylene (A) satisfying the below-mentioned characteristics (a) and (b), and from 60 to 90 wt % of the linear low-density polyethylene (B1) satisfying the below-mentioned characteristics (c) and (d) (where the total of (A) and (B1) is 100 wt %).

(a) Density is from 945 to 970 kg/m$^3$.
(b) MFR is from 0.1 to 15.0 g/10 min.
(c) Density is from 890 to 915 kg/m$^3$.
(d) MFR is from 0.1 to 15.0 g/10 min.
(e) Density is from 930 to 960 kg/m$^3$.
(f) MFR is from 0.1 to 15.0 g/10 min.
(g) Two peaks appear in molecular weight measurement by gel permeation chromatography, and the ratio (Mw/Mn) of weight-average molecular weight (Mw) to number-average molecular weight (Mn) is from 2.0 to 7.0.
(h) A fraction having Mn of not less than 100,000 obtained by molecular-weight fractionation has 0.15 or more long-chain branches per 1,000 carbons of a main chain.

As long as the laminate of the present invention has an outer layer, an intermediate layer, and an inner layer (the inner layer is a heat seal layer) in that order, there is no particular limitation on other layer configurations. As the number of layers, three layers consisting of an outer layer/an intermediate layer/an inner layer described above is most preferred, but is not limited thereto. An outer layer/an intermediate layer/a core layer/an intermediate layer/an inner layer structure, in which an additional layer is configured in the intermediate layer of an outer layer/an intermediate layer/an inner layer structure, may be used, or other layers may be provided as appropriate and as necessary between the outer layer and the intermediate layer or between the intermediate layer and the inner layer. Examples of such other layers include an adhesive layer, a gas barrier layer, an ultraviolet absorbing layer, and the like. For example, a six-layer structure consisting of an outer layer/an adhesive layer/a gas barrier layer/an adhesive layer/an intermediate layer/an inner layer may also be used. Additionally, new layers may be provided on the outside of the outer layer.

Examples of adhesive agents that constitute the adhesive layer include polyurethane-based adhesives, vinyl acetate adhesives, hot melt adhesives, and adhesive resins such as maleic anhydride modified polyolefins and ionomer resins. When the layer configuration includes adhesive layers, the mandatory constituent layers of the outer layer, the intermediate layer, and the inner layer may be laminated by co-extruding them together with these adhesives.

The total thickness of the laminate in the present invention may be determined as appropriate and as necessary without particular limitation, but is preferably from 0.01 to 1 mm, and more preferably from 0.1 to 0.5 mm.

The thickness ratio of the layers is not particularly limited, but a laminate in which the higher-density outer layer and inner layer are thinner to prevent deformation and fusion due to sterilization treatment and the lower-density intermediate layer is thicker to increase transparency is preferred because the balance of transparency and heat resistance is good. The thickness ratio of the layers may be, approximately, outer layer:intermediate layer:inner layer=1 to 30:40 to 98:1 to 30 (where the total of all is 100).

In the laminate of the present invention, one or two layers among the outer layer, the intermediate layer, and the inner layer may be substituted with another resin such as an ethylene-vinyl acetate copolymer resin, polypropylene-type resin, or the like depending on the objective. In particular, in order to have heat resistance against 121° C. sterilization treatment, which is one object of the present invention, a polypropylene-type resin may be used for medical containers that require sterilization treatment. Examples of the polypropylene-type resin generally used in medical container materials include polypropylene homopolymers, propylene-α-olefin random copolymers, propylene-α-olefin block copolymers, and mixtures thereof. Furthermore, it may be a mixture of the above polypropylenes and other thermoplastic elastomers. Examples of the thermoplastic elastomer include ethylene-α-olefin copolymer elastomers such as ethylene-propylene copolymer and ethylene-butene-1 copolymer, and styrene-based thermoplastic elastomers such as SEBS, SBS, and SEPS.

The production method of the laminate of the present invention is not particularly limited, but examples include methods by forming multilayer films or sheets by the water-cooled or air-cooled co-extruded multilayer inflation method, the co-extruded multilayer T-die method, the dry lamination method, the extrusion lamination method, or the like. Among these, the water-cooled co-extruded multilayer inflation method and the co-extruded multilayer T-die method are preferred. Particularly, when the water-cooled co-extruded multilayer inflation method is used, there are many advantages from the perspectives of transparency, hygienic properties, and the like. Furthermore, a laminate may be molded into a bottle shape by the multilayer blow molding method.

[7] Medical Container

The medical container of the present invention possesses a holding portion which holds a drug solution, wherein at least the holding portion is made from the laminate described above. When the above laminate has been formed into a sheet by the water-cooled or air-cooled co-extruded multilayer inflation method, the co-extruded multilayer T-die method, the dry lamination method, the extrusion lamination method, or the like, a bag-shaped holding portion may be formed by overlaying two sheets of the obtained film and heat-sealing the periphery. Furthermore, the holding portion may be formed by molding concave portions to serve as the holding portion using hot plate molding such as vacuum molding or air pressure molding, and then overlaying the concave portions so as to face each other and heat-sealing the periphery. At this point, the port portion serving as the dispensing inlet of the drug solution may be formed by heat-sealing at the same time as forming the above holding portion, or formation of the holding portion and formation of the port portion may be performed in separate steps. The above laminate may also be molded into a bottle shape by multilayer blow molding or the like to form the holding portion. In multilayer blow molding, the holding portion may be formed by extruding a parison made from the laminate, sandwiching the parison with a mold, and then blowing pure air inside the parison. Examples of methods for forming the port portion include a method using a mold for integral molding with the holding portion, a method of heat-sealing the port portion to the holding portion, a method of simultaneous integration with molding of the holding portion by insert blow molding, and the like.

The polyethylene medical container of the present invention may be used across all fields of medicine, and examples of applications include blood bags, platelet preservation bags, infusion (drug solution) bags, double-chamber containers for medical use, bags for artificial dialysis, eye drop containers, injection solution ampoules, and the like.

Advantageous Effects of Invention

Because the laminate of the present invention has excellent transparency, flexibility, barrier properties, and cleanliness (low occurrence of fine particles) and can also maintain transparency even after sterilization treatment at 121° C., it can be advantageously used in medical containers such as infusion bags and plastic ampoules for medical use that require high transparency.

EXAMPLES

The present invention will be described in further detail below while giving examples, but the present invention is not limited by these examples.
A. Resin
Various properties of the resins used in the examples and comparative examples were evaluated by the following methods.
<Molecular Weight, Molecular Weight Distribution>
The weight-average molecular weight (Mw), the number-average molecular weight (Mn), the ratio (Mw/Mn) of weight-average molecular weight (Mw) to number-average molecular weight (Mn), and the peak top molecular weight (Mp) were measured by GPC. Using a GPC instrument (brand name HLC-8121 GPC/HT manufactured by Tosoh Corporation) and a column (brand name TSKgel GMHhr-H (20) HT manufactured by Tosoh Corporation), the column temperature was set to 140° C., and molecular weight was measured using 1,2,4-trichlorobenzene as an eluent. The measurement sample was prepared at a concentration of 1.0 mg/mL, and 0.3 mL of this sample was injected and measured. A molecular weight calibration curve was created using a polystyrene sample of known molecular weight. Mw and Mn were determined as values based on linear polyethylene.
<Fractionation by Molecular Weight>
For fractionation by molecular weight, a column (diameter 21 mm, length 60 cm) filled with glass beads was used as the column. The column temperature was set to 130° C., and 1 g of sample was dissolved in 30 mL of xylene and this was injected. Then, the distillate was removed using xylene/2-ethoxyethanol in a ratio of 5/5 as the developer solvent. After that, the components remaining in the column were distilled out using xylene as a developer solvent, and a polymer solution was obtained. Ethanol was added in an amount equal to 5 times the amount of the obtained polymer solution, and the polymer component was precipitated out, and by filtration and drying, the component having Mn of not less than 100,000 was recovered.
<Long-Chain Branches>
For the number of long-chain branches, the number of branches equal to or longer than a hexyl group was measured by $^{13}$C-NMR using a nuclear magnetic resonance instrument model JNM-GSX400 manufactured by JEOL Ltd. The solvent was benzene-d6/orthodichlorobenzene (volume ratio 30/70). The number of long-chain branches were determined from the average of the peaks of α-carbon (34.6 ppm) and β-carbon (27.3 ppm) as the number per 1,000 carbons (chemical shift 30 ppm) of main-chain methylene.

<Ignition Residue>
In conformance with the Residue on Ignition Test set forth in the Japanese Pharmacopoeia, 50 g of sample was weighed out and then put in a platinum dish and combusted using a gas burner, and then completely ashed in an electric furnace at 650° C. for 1 hr. The weight of the residue at this point was measured, and ignition residue was calculated by determining the percentage relative to the initial weight.
<n-Heptane Extraction Quantity>
Approximately 10 g of crushed sample that passed through 200 mesh was weighed out and added to 400 mL of n-heptane, and extraction was performed for 2 hr at 50° C. The solvent was evaporated off from the extract, and after drying and solidifying, the n-heptane extraction quantity was calculated by determining the percentage of the weight of the obtained extract relative to the initial weight.
<Density>
Density was measured by the density gradient tube method in conformance with JIS K6922-1.
<MFR>
MFR (melt flow rate) was measured in conformance with JIS K6922-1.
<Melt Tension>
A sample, to which thermal stabilizers (1500 ppm of Irganox 1010, 1500 ppm of Irgafos 168, both manufactured by Ciba Specialty Chemicals Inc.) had been added, was kneaded for 30 min under nitrogen flow at 190° C. at a rotation speed of 30 rpm using an internal mixer (brand name Labo Plastomill manufactured by Toyo Seiki Seisaku-Sho, Ltd.), and the resulting substance was used as the sample for melt tension measurement.
In melt tension measurement, a die, 8 mm in length and 2.095 mm in diameter, was mounted on a capillary viscometer (brand name Capillograph manufactured by Toyo Seiki Seisaku-Sho, Ltd.) having a barrel diameter of 9.55 mm so as to result in an inflow angle of 90°. The temperature was set to 160° C., the piston fall rate to 10 mm/min, and the draw ratio to 47, and the load (mN) required to pull was taken as the melt tension. When the maximum draw ratio was less than 47, the load (mN) required to pull at the maximum draw ratio without breaking was taken as the melt tension.
Resins produced by the following methods and commercially available products were used in the examples and comparative examples.
(1) High-Density Polyethylene
(A)-1
[Preparation of Modified Clay]
In a mixed solvent of 4.8 L of deionized water and 3.2 L of ethanol, 354 g of dimethylbehenylamine (($C_{22}H_{45}$)($CH_3$)$_2$N) and 83.3 mL of 37% hydrochloric acid were added, and a dimethylbehenylamine hydrochloride solution was prepared. To this solution, 1,000 g of synthetic hectorite was added and stirred overnight, and after the obtained reaction solution was filtered, the solid content was washed adequately with water. When the solid content was dried, 1,180 g of organic modified clay compound was obtained. The moisture content measured by an infrared moisture meter was 0.8%. Then, this organic modified clay compound was crushed, and the average particle size was adjusted to 6.0 μm.
[Preparation of Polymerization Catalyst]
In a 5-L flask, 450 g of the organic modified clay compound obtained in "Preparation of modified clay compound" and 1.4 kg of hexane were added, and then 1.78 kg of a hexane solution of 20 wt % triisobutylaluminum (1.8 mol) and 7.32 g (18 mmol) of bis(n-butyl-cyclopentadienyl)

zirconium dichloride were added, and this was heated to 60° C. and stirred for 1 hr. The reaction solution was cooled to 45° C. and left to stand for 2 hr, and then the supernatant was removed by tilting. Then, 1.78 kg of a hexane solution of 1 wt % triisobutylaluminum (0.09 mol) was added, and this was reacted for 30 min at 45° C. The reaction solution was left to stand for 2 hr at 45° C., and then the supernatant was removed by tilting. Then, 0.45 kg of a hexane solution of 20 wt % triisobutylaluminum (0.45 mol) was added, this was re-diluted with hexane to make a total of 4.5 L, and a polymerization catalyst was thereby prepared.

[Production of (A)-1]

In a polymerization reactor of internal volume 300 L, 135 kg/hr of hexane, 20.0 kg/hr of ethylene, 0.3 kg/hr of butene-1, 5 NL/hr of hydrogen, and the polymerization catalyst obtained in "Preparation of polymerization catalyst" were continuously supplied. Furthermore, triisobutylaluminum was also supplied continuously as a promoting catalyst to make the concentration thereof to 0.93 mmol/kg in hexane. The polymerization temperature was controlled to 85° C. The obtained high-density polyethylene ((A)-1) had an MFR of 1.0 g/10 min and a density of 952 kg/m$^3$. The evaluation results of the basic characteristics of (A)-1 are shown in Table 1.

(A)-2

[Preparation of Modified Clay]

A modified clay compound was prepared by the same method as (A)-1.

[Preparation of Polymerization Catalyst]

A polymerization catalyst was prepared by the same method as (A)-1.

[Production of (A)-2]

In a polymerization reactor of internal volume 300 L, 135 kg/hr of hexane, 20.0 kg/hr of ethylene, 0.4 kg/hr of butene-1, 8 NL/hr of hydrogen, and the polymerization catalyst obtained in "Preparation of polymerization catalyst" were continuously supplied. Furthermore, triisobutylaluminum was also supplied continuously as a promoting catalyst to make the concentration thereof to 0.93 mmol/kg in hexane. The polymerization temperature was controlled to 85° C. The obtained high-density polyethylene ((A)-2) had an MFR of 3.0 g/10 min and a density of 945 kg/m$^3$. The evaluation results of the basic characteristics of (A)-2 are shown in Table 1.

(A)-3: The following commercially available product was used.

Brand name Nipolon Hard 5700 manufactured by Tosoh Corporation (MFR 1.0 g/10 min, density 954 kg/m$^3$).

The evaluation results of the basic characteristics of (A)-3 are shown in Table 1.

TABLE 1

| | Units | High-density polyethylene | | |
|---|---|---|---|---|
| | | (A)-1 | (A)-2 | (A)-3 |
| MFR | g/10 min | 1.0 | 3.0 | 1.0 |
| Density | kg/m$^3$ | 952 | 945 | 954 |
| Mw/Mn | — | 2.8 | 2.6 | 5.4 |
| Ignition residue | Wt % | 0.008 | 0.011 | 0.025 |

(2) Linear Low-Density Polyethylene (B1)-1

[Preparation of Modified Clay]

In 1,500 mL of water, 30 mL of 37% hydrochloric acid and 106 g of N,N-dimethyl-behenylamine were added, and an N,N-dimethyl-behenyl ammonium hydrochloride aqueous solution was prepared. 300 g of montmorillonite having an average particle size of 7.8 μm (prepared by crushing brand name Kunipia F manufactured by Kunimine Industries Co., Ltd. with a crusher) was added to the above hydrochloride aqueous solution, and reacted for 6 hr. After the reaction ended, the reaction solution was filtered and the obtained cake was dried under reduced pressure for 6 hr, and 370 g of a modified clay compound was obtained.

[Preparation of Polymerization Catalyst]

In a 20-L stainless steel container under a nitrogen atmosphere, 3.3 L of heptane, 0.9 L of a heptane solution of triethylaluminum (diluted to 20 wt %), which was equivalent of 1.13 mol of aluminum atoms, and 50 g of the modified clay compound obtained as described above were added, and stirred for 1 hr. To this, diphenylmethylene(4-phenyl-indenyl)(2,7-di-t-butyl-9-fluorenyl)zirconium dichloride was added at the amount equivalent of 1.25 mmol of zirconium atoms, and stirred for 12 hr. A catalyst was prepared by adding 5.8 L of an aliphatic saturated hydrocarbon solvent (brand name IP SOLVENT 2835 manufactured by Idemitsu Petrochemical Co., Ltd.) to the obtained suspension system. (Zirconium concentration 0.125 mmol/L)

[Production of (B1)-1]

Using a tank-type reactor equipped for high-temperature high-pressure polymerization, ethylene and 1-hexene were continuously introduced at an elevated pressure into the reactor, and the total pressure was set to 90 MPa, the 1-hexene concentration to 18 mol %, and the hydrogen concentration to 7 mol %. Then, the reactor was stirred at 1,500 rpm, and the polymerization catalyst obtained as described above was continuously supplied from the supply port of the reactor, and a polymerization reaction was performed while holding the average temperature at 200° C. The obtained linear low-density polyethylene ((B1)-1) had an MFR of 3.5 g/10 min and a density of 910 kg/m$^3$. The evaluation results of the basic characteristics of (B1)-1 are shown in Table 2.

(B1)-2

[Preparation of Modified Clay]

A modified clay compound was prepared by the same method as (B1)-1.

[Preparation of Polymerization Catalyst]

A polymerization catalyst was prepared by the same method as (B1)-1.

[Production of (B1)-2]

Using a tank-type reactor equipped for high-temperature high-pressure polymerization, ethylene and 1-hexene were continuously introduced at an elevated pressure into the reactor, and the total pressure was set to 90 MPa, the 1-hexene concentration to 18 mol %, and the hydrogen concentration to 5 mol %. Then, the reactor was stirred at 1,500 rpm, and the polymerization catalyst obtained as described above was continuously supplied from the supply port of the reactor, and a polymerization reaction was performed while holding the average temperature at 200° C. The obtained linear low-density polyethylene ((B1)-2) had an MFR of 2.0 g/10 min and a density of 907 kg/m$^3$. The evaluation results of the basic characteristics of (B1)-2 are shown in Table 2.

(B1)-3

[Preparation of Modified Clay]

A modified clay compound was prepared by the same method as (B1)-1.

[Preparation of Polymerization Catalyst]

A polymerization catalyst was prepared by the same method as (B1)-1.

[Production of (B1)-3]

Using a tank-type reactor equipped for high-temperature high-pressure polymerization, ethylene and 1-hexene were continuously introduced at an elevated pressure into the reactor, and the total pressure was set to 90 MPa, the 1-hexene concentration to 20 mol %, and the hydrogen concentration to 15 mol %. Then, the reactor was stirred at 1,500 rpm, and the polymerization catalyst obtained as described above was continuously supplied from the supply port of the reactor, and a polymerization reaction was performed while holding the average temperature at 200° C. The obtained linear low-density polyethylene ((B1)-3) had an MFR of 12.0 g/10 min and a density of 907 kg/m³. The evaluation results of the basic characteristics of (B1)-3 are shown in Table 2.

(B1)-4

[Preparation of Modified Clay]

A modified clay compound was prepared by the same method as (B1)-1.

[Preparation of Polymerization Catalyst]

A polymerization catalyst was prepared by the same method as (B1)-1.

[Production of (B1)-4]

Using a tank-type reactor equipped for high-temperature high-pressure polymerization, ethylene and 1-hexene were continuously introduced at an elevated pressure into the reactor, and the total pressure was set to 90 MPa, the 1-hexene concentration to 23 mol %, and the hydrogen concentration to 1 mol %. Then, the reactor was stirred at 1,500 rpm, and the polymerization catalyst obtained as described above was continuously supplied from the supply port of the reactor, and a polymerization reaction was performed while holding the average temperature at 200° C. The obtained linear low-density polyethylene ((B1)-4) had an MFR of 0.8 g/10 min and a density of 900 kg/m³. The evaluation results of the basic characteristics of (B1)-4 are shown in Table 2.

(B1)-5: The following commercially available product was used. Brand name Nipolon-Z ZF220 manufactured by Tosoh Corporation (MFR 2.0 g/10 min, density 913 kg/m³).

The evaluation results of the basic characteristics of (B1)-5 are shown in Table 2.

(B2)-1

[Preparation of Modified Clay]

A modified clay compound was prepared by the same method as (B1)-1.

[Preparation of Polymerization Catalyst]

In a 20-L stainless steel container under a nitrogen atmosphere, 2.5 L of heptane, 3.6 L of a heptane solution of triethylaluminum (20 wt % diluted product), which was equivalent of 4.5 mol of aluminum atoms, and 300 g of the modified clay compound obtained as described above were added, and stirred for 1 hr. To this, diphenylmethylene (cyclopentadienyl)(2,7-di-t-butyl-9-fluorenyl)zirconium dichloride, at an amount equivalent of 10 mmol of zirconium atoms, was added, and stirred for 12 hr. A catalyst was prepared by adding 8.7 L of an aliphatic saturated hydrocarbon solvent (brand name IP SOLVENT 2835 manufactured by Idemitsu Petrochemical Co., Ltd.) to the obtained suspension system. (Zirconium concentration 0.67 mmol/L)

[Production of (B2)-1]

Using a tank-type reactor equipped for high-temperature high-pressure polymerization, ethylene and 1-hexene were continuously introduced at an elevated pressure into the reactor, and the total pressure was set to 90 MPa, the 1-hexene concentration to 20 mol %, and the hydrogen concentration to 4 mol %. Then, the reactor was stirred at 1,500 rpm, and the polymerization catalyst obtained as described above was continuously supplied from the supply port of the reactor, and a polymerization reaction was performed while holding the average temperature at 200° C. The obtained linear low-density polyethylene ((B2)-1) had an MFR of 2.5 g/10 min and a density of 921 kg/m³. The evaluation results of the basic characteristics of (B2)-1 are shown in Table 2.

(B2)-2

[Preparation of Modified Clay]

A modified clay compound was prepared by the same method as (B1)-1.

[Preparation of Polymerization Catalyst]

A polymerization catalyst was prepared by the same method as (B2)-1.

[Production of (B2)-2]

Using a tank-type reactor equipped for high-temperature high-pressure polymerization, ethylene and 1-hexene were continuously introduced at an elevated pressure into the reactor, and the total pressure was set to 90 MPa, the 1-hexene concentration to 10 mol %, and the hydrogen concentration to 5 mol %. Then, the reactor was stirred at 1,500 rpm, and the polymerization catalyst obtained as described above was continuously supplied from the supply port of the reactor, and a polymerization reaction was performed while holding the average temperature at 200° C. The obtained linear low-density polyethylene ((B2)-2) had an MFR of 3.6 g/10 min and a density of 931 kg/m³. The evaluation results of the basic characteristics of (B2)-2 are shown in Table 2.

(B2)-3

A blend in which the above linear low-density polyethylenes (B2)-1 and (B2)-2 were blended in a 50/50 ratio (parts by weight/parts by weight) was used as (B2)-3. Furthermore, a melt-kneaded product obtained by kneading (B2)-3 under nitrogen flow at 170° C. at a rotation speed of 30 rpm for 15 min using an internal mixer (brand name Labo Plastomill manufactured by Toyo Seiki Seisaku-Sho, Ltd.) had an MFR of 3.1 g/10 min and a density of 926 kg/m³. The evaluation results of the basic characteristics of this melt-kneaded product are shown in Table 2.

(B2)-4: The following commercially available product was used.

Brand name Nipolon-Z ZF230 manufactured by Tosoh Corporation (MFR 2.0 g/10 min, density 920 kg/m³).

The evaluation results of the basic characteristics of (B2)-4 are shown in Table 2.

TABLE 2

| | | Linear low-density polyethylene | | | | |
|---|---|---|---|---|---|---|
| | Units | (B1)-1 | (B1)-2 | (B1)-3 | (B1)-4 | (B1)-5 |
| MFR | g/10 min | 3.5 | 2.0 | 12.0 | 0.8 | 2.0 |
| Density | kg/m³ | 910 | 907 | 907 | 900 | 913 |
| Mw/Mn | — | 2.4 | 2.2 | 2.1 | 2.4 | 3.5 |
| n-heptane extraction quantity | Wt % | 0.8 | 1.0 | 1.1 | 1.2 | 1.5 |

| | | Linear low-density polyethylene | | | |
|---|---|---|---|---|---|
| | Units | (B2)-1 | (B2)-2 | (B2)-3 | (B2)-4 |
| MFR | g/10 min | 2.5 | 3.6 | 3.1 | 2.0 |
| Density | kg/m³ | 921 | 931 | 926 | 920 |
| Mw/Mn | — | 2.0 | 2.2 | 2.3 | 4.6 |

TABLE 2-continued

| | | | | | |
|---|---|---|---|---|---|
| n-heptane extraction quantity | Wt % | 0.4 | 0.2 | 0.3 | 1.8 |

(3) Ethylene-Based Polymer
(C)-1
[Preparation of Modified Clay]

300 mL of industrial alcohol (brand name Ekinen F-3 manufactured by Japan Alcohol Trading Co., Ltd.) and 300 mL of distilled water were put in a 1-L flask, and then 17.5 g of concentrated hydrochloric acid and 49.4 g (140 mmol) of dimethylbehenylamine (brand name Amine DM22D manufactured by Lion Corporation) were added. This was heated to 45° C., and after 100 g of synthetic hectorite (brand name Laponite RDS manufactured by Rockwood Additives Ltd.) was dispersed, the mixture was heated to 60° C. and stirred for 1 hr while that temperature was maintained. After the slurry was filter-separated, it was washed twice with 600 mL of 60° C. water and then dried for 12 hr in an 85° C. dryer, and 132 g of organic modified clay was thereby obtained. This organic modified clay was crushed in a jet mill to result in a median size of 15 μm.

[Preparation of Polymerization Catalyst]

A 300-mL flask equipped with a thermometer and a reflux tube was purged with nitrogen, and then 25.0 g of the organic modified clay obtained in "Preparation of modified clay" and 108 mL of hexane were introduced. Then, 0.4406 g of dimethylsilylene(cyclopentadienyl)(2,4,7-trimethylindenyl)zirconium dichloride and 142 mL of 20% triisobutylaluminum were added, and stirred for 3 hr at 60° C. After it was cooled to 45° C., the supernatant was removed and washed five times with 200 mL of hexane, and then 200 mL of hexane was added, and a catalyst suspension (solid content: 12.4 wt %) was obtained.

[Production of (C)-1]

In a 2-L autoclave, 1.2 L of hexane, 1.0 mL of 20% triisobutylaluminum, and 52 mg (equivalent to 6.4 mg of solid content) of the catalyst suspension obtained in "Preparation of polymerization catalyst" were added, and after heating to 70° C., 17.6 g of 1-butene was added, and then ethylene/hydrogen mixed gas was continuously supplied so as to result in a partial pressure of 0.80 MPa (concentration of hydrogen in ethylene/hydrogen mixed gas: 590 ppm). After 90 minutes had elapsed, it was depressurized, and the slurry was filtered and then dried to yield 61.8 g of polymer. The obtained polymer had an MFR of 1.6 g/10 min and a density of 930 kg/m³. The number-average molecular weight was 17,600, the weight-average molecular weight was 86,700, and peaks were observed at the positions of molecular weight 30,500 and 155,300. The number of long-chain branches per 1,000 carbons of the main chain in the fraction having Mn of not less than 100,000 when fractioned by molecular weight was 0.27. The proportion of the fraction having Mn of not less than 100,000 when fractioned by molecular weight was 20.1 wt % of the entire polymer. The melt tension was 75 mN. The evaluation results are shown in Table 3.

(C)-2
[Preparation of Modified Clay]

300 mL of industrial alcohol (brand name Ekinen F-3 manufactured by Japan Alcohol Trading Co., Ltd.) and 300 mL of distilled water were put in a 1-L flask, and then 18.8 g of concentrated hydrochloric acid and 49.1 g (120 mmol) of dimethylhexacosylamine ($Me_2N(C_{26}H_{53})$) synthesized by a commonly used method) were added. This was heated to 45° C., and after 100 g of synthetic hectorite (brand name Laponite RDS manufactured by Rockwood Additives Ltd.) was dispersed, the mixture was heated to 60° C. and stirred for 1 hr while that temperature was maintained. After the slurry was filter-separated, it was washed twice with 600 mL of 60° C. water and then dried for 12 hr in an 85° C. dryer, and 140 g of organic modified clay was thereby obtained. This organic modified clay was crushed in a jet mill to result in a median size of 14 μm.

[Preparation of Polymerization Catalyst]

A 300-mL flask equipped with a thermometer and a reflux tube was purged with nitrogen, and then 25.0 g of the organic modified clay obtained in "Preparation of modified clay" and 108 mL of hexane were introduced. Then, 0.4406 g of dimethylsilylene(cyclopentadienyl)(2,4,7-trimethyl-1-indenyl)zirconium dichloride and 142 mL of 20% triisobutylaluminum were added, and stirred for 3 hr at 60° C. After it was cooled to 45° C., the supernatant was removed and washed five times with 200 mL of hexane, and then 200 mL of hexane was added, and a catalyst suspension (solid content: 12.0 wt %) was obtained.

[Production of (C)-2]

In a 2-L autoclave, 1.2 L of hexane, 1.0 mL of 20% triisobutylaluminum, and 75 mg (equivalent to 9.0 mg of solid content) of the catalyst suspension obtained in "Preparation of polymerization catalyst" were added, and after heating to 80° C., 8.3 g of 1-butene was added, and then ethylene/hydrogen mixed gas was continuously supplied so as to result in a partial pressure of 0.85 MPa (concentration of hydrogen in ethylene/hydrogen mixed gas: 850 ppm). After 90 minutes had elapsed, it was depressurized, and the slurry was filtered and then dried to yield 58.5 g of polymer. The obtained polymer had an MFR of 4.0 g/10 min and a density of 941 kg/m³. The number-average molecular weight was 21,200, the weight-average molecular weight was 74,000, and peaks were observed at the positions of molecular weight 41,500 and 217,100. The number of long-chain branches per 1,000 carbons of the main chain in the fraction having Mn of not less than 100,000 when fractioned by molecular weight was 0.18. The proportion of the fraction having Mn of not less than 100,000 when fractioned by molecular weight was 14.8 wt % of the entire polymer. The melt tension was 49 mN. The evaluation results are shown in Table 3.

(C)-3
[Preparation of Modified Clay]300 mL of industrial alcohol (brand name Ekinen F-3 manufactured by Japan Alcohol Trading Co., Ltd.) and 300 mL of distilled water were put in a 1-L flask, and then 15.0 g of concentrated hydrochloric acid and 42.4 g (120 mmol) of dimethylbehenylamine (brand name Amine DM22D manufactured by Lion Corporation) were added. This was heated to 45° C., and after 100 g of synthetic hectorite (brand name Laponite RDS manufactured by Rockwood Additives Ltd.) was dispersed, the mixture was heated to 60° C. and stirred for 1 hr while that temperature was maintained. After the slurry was filter-separated, it was washed twice with 600 mL of 60° C. water and then dried for 12 hr in an 85° C. dryer, and 122 g of organic modified clay was thereby obtained. This organic modified clay was crushed in a jet mill to result in a median size of 15 μm.

[Preparation of Polymerization Catalyst]

A 300-mL flask equipped with a thermometer and a reflux tube was purged with nitrogen, and then 25.0 g of the organic modified clay obtained in "Preparation of modified clay" and 108 mL of hexane were introduced. Then, 0.4406 g of dimethylsilylene(cyclopentadienyl)(2,4,7-trimethyl-1- indenyl)zirconium dichloride and 142 mL of 20% triisobutylaluminum were added, and stirred for 3 hr at 60° C. After it was cooled to 45° C., the supernatant was removed and washed five times with 200 mL of hexane, and then 200 mL of hexane was added, and a catalyst suspension (solid content: 11.5 wt %) was obtained.

[Production of (C)-3]

In a 2-L autoclave, 1.2 L of hexane, 1.0 mL of 20% triisobutylaluminum, and 70 mg (equivalent to 8.4 mg of solid content) of the catalyst suspension obtained in "Preparation of polymerization catalyst" were added, and after heating to 80° C., 2.4 g of 1-butene was added, and then ethylene/hydrogen mixed gas was continuously supplied so as to result in a partial pressure of 0.90 MPa (concentration of hydrogen in ethylene/hydrogen mixed gas: 720 ppm). After 90 minutes had elapsed, it was depressurized, and the slurry was filtered and then dried to yield 63.0 g of polymer. The obtained polymer had an MFR of 11.5 g/10 min and a density of 954 kg/m$^3$. The number-average molecular weight was 16,200, the weight-average molecular weight was 58,400, and peaks were observed at the positions of molecular weight 28,200 and 181,000. The number of long-chain branches per 1,000 carbons of the main chain in the fraction having Mn of not less than 100,000 when fractioned by molecular weight was 0.16. The proportion of the fraction having Mn of not less than 100,000 when fractioned by molecular weight was 6.8 wt % of the entire polymer. The melt tension was 38 mN. The evaluation results are shown in Table 3.

(C)-4

[Preparation of Modified Clay]

300 mL of industrial alcohol (brand name Ekinen F-3 manufactured by Japan Alcohol Trading Co., Ltd.) and 300 mL of distilled water were put in a 1-L flask, and then 20.0 g of concentrated hydrochloric acid and 56.5 g (160 mmol) of dimethylbehenylamine (brand name Amine DM22D manufactured by Lion Corporation) were added. This was heated to 45° C., and after 100 g of synthetic hectorite (brand name Laponite RDS manufactured by Rockwood Additives Ltd.) was dispersed, the mixture was heated to 60° C. and stirred for 1 hr while that temperature was maintained. After the slurry was filter-separated, it was washed twice with 600 mL of 60° C. water and then dried for 12 hr in an 85° C. dryer, and 145 g of organic modified clay was thereby obtained. This organic modified clay was crushed in a jet mill to result in a median size of 15 µm.

[Preparation of Polymerization Catalyst]

A 300-mL flask equipped with a thermometer and a reflux tube was purged with nitrogen, and then 25.0 g of the organic modified clay obtained in (1) and 108 mL of hexane were introduced. Then, 0.4406 g of dimethylsilylene(cyclopentadienyl)(2,4,7-trimethyl-1-indenyl)zirconium dichloride and 142 mL of 20% triisobutylaluminum were added, and stirred for 3 hr at 60° C. After it was cooled to 45° C., the supernatant was removed and washed five times with 200 mL of hexane, and then 200 mL of hexane was added, and a catalyst suspension (solid content: 11.2 wt %) was obtained.

[Production of (C)-4]

In a 2-L autoclave, 1.2 L of hexane, 1.0 mL of 20% triisobutylaluminum, and 74 mg (equivalent to 8.3 mg of solid content) of the catalyst suspension obtained in "Preparation of polymerization catalyst" were added, and after heating to 65° C., 17.5 g of 1-butene was added, and then ethylene/hydrogen mixed gas was continuously supplied so as to result in a partial pressure of 0.75 MPa (concentration of hydrogen in ethylene/hydrogen mixed gas: 570 ppm). After 90 minutes had elapsed, it was depressurized, and the slurry was filtered and then dried to yield 51.5 g of polymer. The obtained polymer had an MFR of 0.8 g/10 min and a density of 928 kg/m$^3$. The number-average molecular weight was 17,900, the weight-average molecular weight was 99,300, and peaks were observed at the positions of molecular weight 28,100 and 229,100. The number of long-chain branches per 1,000 carbons of the main chain in the fraction having Mn of not less than 100,000 when fractioned by molecular weight was 0.26. The proportion of the fraction having Mn of not less than 100,000 when fractioned by molecular weight was 25.4 wt % of the entire polymer. The melt tension was 90 mN. The evaluation results are shown in Table 3.

(C)-5

[Preparation of Modified Clay]

300 mL of industrial alcohol (brand name Ekinen F-3 manufactured by Japan Alcohol Trading Co., Ltd.) and 300 mL of distilled water were put in a 1-L flask, and then 15.0 g of concentrated hydrochloric acid and 42.4 g (120 mmol) of dimethylbehenylamine (brand name Amine DM22D manufactured by Lion Corporation) were added. This was heated to 45° C., and after 100 g of synthetic hectorite (brand name Laponite RDS manufactured by Rockwood Additives Ltd.) was dispersed, the mixture was heated to 60° C. and stirred for 1 hr while that temperature was maintained. After the slurry was filter-separated, it was washed twice with 600 mL of 60° C. water and then dried for 12 hr in an 85° C. dryer, and 122 g of organic modified clay was thereby obtained. This organic modified clay was crushed in a jet mill to result in a median size of 15 µm.

[Preparation of Polymerization Catalyst]

A 300-mL flask equipped with a thermometer and a reflux tube was purged with nitrogen, and then 25.0 g of the organic modified clay obtained in "Preparation of modified clay" and 108 mL of hexane were introduced. Then, 0.4406 g of dimethylsilylene(cyclopentadienyl)(2,4,7-trimethyl-1-indenyl)zirconium dichloride and 142 mL of 20% triisobutylaluminum were added, and stirred for 3 hr at 60° C. After it was cooled to 45° C., the supernatant was removed and washed five times with 200 mL of hexane, and then 200 mL of hexane was added, and a catalyst suspension (solid content: 11.5 wt %) was obtained.

[Production of (C)-5]

In a 2-L autoclave, 1.2 L of hexane, 1.0 mL of 20% triisobutylaluminum, and 90 mg (equivalent to 10.4 mg of solid content) of the catalyst suspension obtained in "Preparation of polymerization catalyst" were added, and after heating to 65° C., 17.5 g of 1-butene was added, and then ethylene/hydrogen mixed gas was continuously supplied so as to result in a partial pressure of 0.75 MPa (concentration of hydrogen in ethylene/hydrogen mixed gas: 550 ppm). After 90 minutes had elapsed, it was depressurized, and the slurry was filtered and then dried to yield 61.4 g of polymer. The obtained polymer had an MFR of 0.08 g/10 min and a density of 926 kg/m$^3$. The number-average molecular weight was 21,900, the weight-average molecular weight was 127,000, and peaks were observed at the positions of molecular weight 31,300 and 247,800. The number of long-chain branches per 1,000 carbons of the main chain in the fraction having Mn of not less than 100,000 when fractioned by molecular weight was 0.32. The proportion of the fraction having Mn of not less than 100,000 when fractioned by molecular weight was 36.9 wt % of the entire polymer. The melt tension was 140 mN. The evaluation results are shown in Table 3.

(C)-6
[Preparation of Modified Clay]

300 mL of industrial alcohol (brand name Ekinen F-3 manufactured by Japan Alcohol Trading Co., Ltd.) and 300 mL of distilled water were put in a 1-L flask, and then 15.0 g of concentrated hydrochloric acid and 42.4 g (120 mmol) of dimethylbehenylamine (brand name Amine DM22D manufactured by Lion Corporation) were added. This was heated to 45° C., and after 100 g of synthetic hectorite (brand name Laponite RDS manufactured by Rockwood Additives Ltd.) was dispersed, the mixture was heated to 60° C. and stirred for 1 hr while that temperature was maintained. After the slurry was filter-separated, it was washed twice with 600 mL of 60° C. water and then dried for 12 hr in an 85° C. dryer, and 122 g of organic modified clay was thereby obtained. This organic modified clay was crushed in a jet mill to result in a median size of 15 μm.

[Preparation of Polymerization Catalyst]

A 300-mL flask equipped with a thermometer and a reflux tube was purged with nitrogen, and then 25.0 g of the organic modified clay obtained in "Preparation of modified clay" and 165 mL of hexane were introduced. Then, 0.3485 g of dimethylsilane diyl-bis(cyclopentadienyl)zirconium dichloride and 85 mL of a hexane solution of triethylaluminum (1.18 M) were added, and stirred for 3 hr at 60° C. It was left to stand, and after it had cooled to room temperature, the supernatant was removed and washed twice with 200 mL of a hexane solution of 1% triisobutylaluminum. The washed supernatant was removed, and a hexane solution of 5% triisobutylaluminum was added to make a total of 250 mL. Then, a solution, which was separately prepared by adding 5 mL of a hexane solution of 20% triisobutylaluminum (0.71 M) to a suspension of 0.1165 g of diphenylmethylene(1-dicyclopentadienyl)(2,7-di-tert-butyl-9-fluorenyl)zirconium dichloride in 10 mL of hexane, was added, and stirred for 6 hr at room temperature. It was left to stand, and the supernatant was removed and washed twice with 200 mL of hexane, and then 200 mL of hexane was added, and a catalyst suspension (solid content: 12.0 wt %) was obtained.

[Production of (C)-6]

In a 2-L autoclave, 1.2 L of hexane, 1.0 mL of 20% triisobutylaluminum, and 125 mg (equivalent to 15.0 mg of solid content) of the catalyst suspension obtained in "Preparation of polymerization catalyst" were added, and after heating to 85° C., 2.4 g of 1-butene was added, and then ethylene was continuously supplied so as to result in a partial pressure of 0.90 MPa. After 90 minutes had elapsed, it was depressurized, and the slurry was filtered and then dried to yield 45.0 g of polymer. The obtained polymer had an MFR of 4.4 g/10 min and a density of 951 kg/m$^3$. The number-average molecular weight was 9,100, the weight-average molecular weight was 77,100, and peaks were observed at the positions of molecular weight 10,400 and 168,400. The number of long-chain branches per 1,000 carbons of the main chain in the fraction having Mn of not less than 100,000 when fractioned by molecular weight was 0.24. The proportion of the fraction having Mn of not less than 100,000 when fractioned by molecular weight was 15.7 wt % of the entire polymer. The melt tension was 210 mN. The evaluation results are shown in Table 3.

(S)-1: The following commercially available product was used.

Brand name Petrosen 219 manufactured by Tosoh Corporation (MFR 3.0 g/10 min, density 934 kg/m$^3$).

The evaluation results of the basic characteristics of (S)-1 are shown in Table 3.

(S)-2: The following commercially available product was used.

Brand name RS1000 manufactured by Japan Polyolefins Corporation (MFR 0.1 g/10 min, density 953 kg/m$^3$)

The evaluation results of the basic characteristics of (S)-2 are shown in Table 3.

TABLE 3

| | | Ethylene-based polymer | | | |
|---|---|---|---|---|---|
| | Units | (C)-1 | (C)-2 | (C)-3 | (C)-4 |
| MFR | g/10 min | 1.6 | 4.0 | 11.5 | 0.8 |
| Density | kg/m$^3$ | 930 | 941 | 954 | 928 |
| Mn | — | 17,600 | 21,200 | 16,200 | 17,900 |
| Mw | — | 86,700 | 74,000 | 58,400 | 99,300 |
| Mw/Mn | — | 4.9 | 3.5 | 3.6 | 5.6 |
| Molecular weight peak | — | 30,500 | 41,500 | 28,200 | 28,100 |
| | — | 155,300 | 217,100 | 181,000 | 229,100 |
| Number of long-chain branches in components having Mn of not less than 100,000 | Per 1,000 carbons | 0.27 | 0.18 | 0.16 | 0.26 |
| Proportion of components having Mn of not less than 100,000 | Wt % | 20.1 | 14.8 | 6.8 | 25.4 |
| MS | mN | 75 | 49 | 38 | 90 |

| | | Ethylene-based polymer | | | |
|---|---|---|---|---|---|
| | Units | (C)-5 | (C)-6 | (S)-1 | (S)-2 |
| MFR | g/10 min | 0.08 | 4.4 | 3.0 | 0.1 |
| Density | kg/m$^3$ | 926 | 951 | 934 | 953 |
| Mn | — | 21,900 | 9,100 | 18,300 | 21,600 |
| Mw | — | 127,000 | 77,100 | 66,600 | 128,300 |
| Mw/Mn | — | 5.8 | 8.5 | 3.6 | 6.0 |
| Molecular weight peak | — | 31,300 | 10,400 | 39,800 | 45,700 |
| | — | 247,800 | 168,400 | — | — |
| Number of long-chain branches in components having Mn of not less than 100,000 | Per 1,000 carbons | 0.32 | 0.24 | 5.30 | Less than 0.01 |
| Proportion of components having Mn of not less than 100,000 | Wt % | 36.9 | 15.7 | 17.8 | 31.8 |
| MS | mN | 140 | 210 | 90 | 290 |

B. Laminate and Hermetically Sealed Container

The laminates and medical containers used in the examples and comparative examples were produced and sterilization treatment was performed by the methods described below.

<Production of Laminate and Medical Container>

Using a three-layer water-cooled inflation molder (manufactured by Placo Co., Ltd.), a three-layer film having a film width of 135 mm and a film thickness of 250 μm was molded at a cylinder temperature of 180° C., a water bath temperature of 15° C., and a pulling rate of 4 m/min. The thickness of each layer was outer layer/intermediate layer/inner layer=20 μm/210 μm/20 μm. Then, a sample 195 mm long was cut out from the three-layer film. One edge was heat-sealed to form a bag shape, and then it was filled with 300 mL of ultrapure water while providing 50 mL of head room, to produce a medical container.

<Sterilization Treatment>

The above medical container was sterilized for 20 min at 121° C. using a steam sterilizer (manufactured by Hisaka Works, Ltd.).

Various properties of the laminates and medical containers used in the examples and comparative examples were evaluated by the following methods.

<Molding Stability>

The stability of the film (bubble) during film formation by a three-layer water-cooled inflation molder was observed visually and evaluated.

○: Bubble stability is good
×: Bubble fluctuation is large

<Film Surface Smoothness>

The surface state of the above molded film was observed visually and evaluated.

○: Surface smoothness is good
×: Surface roughness is large

<Film Appearance>

Wrinkling and deformation of the film surface as well as fusion or the like between inner layers after sterilization treatment were observed visually and evaluated. When no wrinkling or deformation was seen, a score of 4 points was given; when slight wrinkling or deformation was seen, a score of 2 points was given; when fusion between inner layers was seen, a score of 1 point was given.

<Transparency>

A test piece measuring 10 mm wide by 50 mm long was cut out from the above three-layer film and from the sterilized medical container, and light transmittance at wavelength 450 nm was measured in purified water using an ultraviolet-visible spectrophotometer (model V-530 manufactured by JASCO Corporation). The measure of a good medical container was 70% or greater light transmittance maintained after sterilization treatment.

<Film Flexibility>

In accordance with JIS K7161, a test piece was punched out from the medical container after sterilization treatment and the 5% elastic modulus was measured using a tensile tester (model Autograph DCS-500 manufactured by Shimadzu Corporation). When the elastic modulus was not greater than 200 MPa, flexibility was considered good, and when greater than 200 MPa, flexibility was considered poor.

○: Flexibility is good
×: Flexibility is poor

<Moisture Permeability>

In accordance with method A of JIS K7129 (the moisture sensor method), the permeability of a test piece cut out from the above medical container after sterilization treatment was measured using a water vapor permeability tester (model L80-5000 manufactured by Lyssy). The measure of a medical container having good barrier properties was permeability of not greater than 1.0 g $(m^2 \cdot 24\ h)$.

<Cleanliness (Fine Particle Count)>

A medical container produced by the method described in "Production of medical container" above was filled with ultrapure water, which had been confirmed to contain zero fine particles 1 μm or greater per 10 mL, and after it was hermetically sealed, hot-water sterilization treatment was performed for 20 min at 121° C. After letting it stand for 1 day, the number of fine particles 1 μm or greater was measured using a fine particle counter model M-3000•4100•HR-60HA manufactured by HIAC/ROYCO. Note that these operations were all performed in a class 1000 clean room. The measure of a medical container with good cleanliness was a fine particle count of not greater than 10 particles per mL.

Example 1

Using the resin compositions shown in Tables 4 and 5, three-layer films were molded using a water-cooled inflation molder, and molding stability, film surface smoothness, and transparency were evaluated. Then, the obtained films were heat-sealed and made into medical containers filled with ultrapure water. High-pressure steam sterilization treatment was performed at 121° C., and the film appearance, transparency, flexibility, permeability, and cleanliness after sterilization treatment were evaluated. The results are shown in Table 6.

Examples 2 to 10, Comparative Examples 1 to 10

Three-layer films and medical containers were produced and evaluated in the same manner as Example 1 except that the resin compositions used in each layer were modified as shown in Tables 4 and 5. The results are shown in Tables 6 and 7.

TABLE 4

| Resin composition for inner and outer layers | | X-1 | X-2 | X-3 | X-4 | X-5 | X-6 | X-7 |
|---|---|---|---|---|---|---|---|---|
| High-density apolyethylene (A) | Resin no. | (A)-1 | (A)-2 | (A)-1 | (A)-2 | (A)-2 | (A)-1 | (A)-2 |
| | Density | 952 | 946 | 952 | 945 | 945 | 952 | 945 |
| | MFR | 1.0 | 3.0 | 1.0 | 3.0 | 3.0 | 1.0 | 3.0 |
| Linear low-density polyethylene (B1) | Resin no. | (B1)-1 | (B1)-2 | — | (B1)-4 | (B2)-1 | (B1)-4 | (B1)-2 |
| | Density | 910 | 907 | — | 900 | 921 | 900 | 907 |
| | MFR | 3.5 | 2.0 | — | 0.8 | 2.5 | 0.8 | 2.0 |
| Ethylene-based polymer (C) | Resin no. | (C)-1 | (C)-2 | (C)-1 | (C)-3 | (C)-1 | (C)-2 | (C)-1 |
| | Density | 930 | 941 | 930 | 954 | 930 | 941 | 930 |
| | MFR | 1.6 | 4.0 | 1.6 | 11.5 | 1.6 | 4.0 | 1.6 |
| Composition (A)/(B)/(C) | Wt % | 45/40/15 | 30/30/40 | 75/0/25 | 60/30/10 | 30/40/30 | 25/30/45 | 85/10/5 |

| Resin composition for inner and outer layers | | X-8 | X-9 | X-10 | X-11 | X-12 | X-13 | X-14 |
|---|---|---|---|---|---|---|---|---|
| High-density apolyethylene | Resin no. | (A)-1 | (A)-1 | (A)-2 | (A)-3 | (A)-2 | (A)-1 | (A)-2 |
| | Density | 952 | 952 | 945 | 954 | 945 | 952 | 945 |

TABLE 4-continued

| (A) | MFR | 1.0 | 1.0 | 3.0 | 1.0 | 3.0 | 1.0 | 3.0 |
|---|---|---|---|---|---|---|---|---|
| Linear low-density polyethylene (B1) | Resin no. | (B1)-1 | (B1)-1 | (B1)-4 | (B1)-2 | (B1)-5 | (B1)-1 | (B1)-1 |
| | Density | 910 | 910 | 900 | 907 | 913 | 910 | 910 |
| | MFR | 3.5 | 3.5 | 0.8 | 2.0 | 2.0 | 3.5 | 3.5 |
| Ethylene-based polymer (C) | Resin no. | (C)-4 | (C)-5 | (C)-6 | (C)-1 | (C)-2 | (S)-1 | (S)-2 |
| | Density | 928 | 926 | 951 | 930 | 941 | 934 | 953 |
| | MFR | 0.80 | 0.80 | 4.40 | 1.6 | 4.0 | 3.00 | 0.10 |
| Composition (A)/(B)/(C) | Wt % | 30/30/40 | 30/30/40 | 60/30/10 | 30/40/30 | 30/30/40 | 30/30/40 | 30/40/30 |

TABLE 5

| Resin composition for intermediate layer | | Y-1 | Y-2 | Y-3 | Y-4 | Y-5 | Y-6 | Y-7 | Y-8 | Y-9 |
|---|---|---|---|---|---|---|---|---|---|---|
| High-density polyethylene (A) | Resin no. | (A)-1 | (A)-2 | (A)-1 | (A)-1 | (A)-2 | (A)-1 | (A)-2 | (A)-1 | (A)-2 |
| | Density | 952 | 945 | 952 | 952 | 945 | 952 | 945 | 952 | 945 |
| | MFR | 1.0 | 3.0 | 1.0 | 1.0 | 3.0 | 1.0 | 3.0 | 1.0 | 3.0 |
| Linear low-density polyethylene (B1) | Resin no. | (B1)-2 | (B1)-4 | (B1)-1 | (B1)-4 | (B1)-2 | (B1)-2 | (B1)-2 | (B1)-2 | (B2)-1 |
| | Density | 907 | 900 | 910 | 900 | 907 | 907 | 907 | 907 | 921 |
| | MFR | 2.0 | 0.8 | 3.5 | 0.8 | 2.0 | 2.0 | 2.0 | 2.0 | 2.5 |
| (A)/(B) | wt % | 20/80 | 40/60 | 15/85 | 30/70 | 25/75 | 20/80 | 20/80 | 50/50 | 20/80 |
| Linear low-density polyethylene (B2) | Resin no. | — | — | — | (B2)-2 | (B2)-1 | (B2)-3 | (B2)-4 | — | — |
| | Density | — | — | — | 931 | 921 | 926 | 920 | — | — |
| | MFR | — | — | — | 3.6 | 2.5 | 3.0 | 2.0 | — | — |
| [(A) − (B1)]/(B2) | Parts by weight | 100/0 | 100/0 | 100/0 | 100/20 | 100/10 | 100/25 | 100/10 | 100/0 | 100/0 |

TABLE 6

| | | Units | Example 1 | Example 2 | Example 3 | Example 4 | Example 5 |
|---|---|---|---|---|---|---|---|
| Resin composition | Outer layer | — | X-1 | X-2 | X-3 | X-4 | X-2 |
| | Intermediate layer | — | Y-1 | Y-2 | Y-3 | Y-2 | Y-4 |
| | Inner layer | — | X-1 | X-1 | X-1 | X-2 | X-2 |
| Film properties | Molding stability | — | ○ | ○ | ○ | ○ | ○ |
| | Surface smoothness | — | ○ | ○ | ○ | ○ | ○ |
| | Appearance after sterilization treatment | — | 4 | 4 | 4 | 4 | 4 |
| | Transparency Before sterilization treatment | % | 88 | 86 | 83 | 85 | 86 |
| | After sterilization treatment | % | 82 | 81 | 78 | 80 | 81 |
| | Flexibility | — | ○ | ○ | ○ | ○ | ○ |
| | Moisture permeability | g/(m² · 24 h) | 0.9 | 0.7 | 0.9 | 0.7 | 0.6 |
| | Cleanliness | per mL | 7 | 8 | 7 | 8 | 8 |

| | | Units | Example 6 | Example 7 | Example 8 | Example 9 | Example 10 |
|---|---|---|---|---|---|---|---|
| Resin composition | Outer layer | — | X-1 | X-3 | X-4 | X-11 | X-12 |
| | Intermediate layer | — | Y-5 | Y-6 | Y-7 | Y-1 | Y-1 |
| | Inner layer | — | X-1 | X-4 | X-3 | X-1 | X-1 |
| Film properties | Molding stability | — | ○ | ○ | ○ | ○ | ○ |
| | Surface smoothness | — | ○ | ○ | ○ | ○ | ○ |
| | Appearance after sterilization treatment | — | 4 | 4 | 4 | 4 | 4 |
| | Transparency Before sterilization treatment | % | 87 | 85 | 83 | 87 | 85 |
| | After sterilization treatment | % | 80 | 78 | 76 | 79 | 74 |
| | Flexibility | — | ○ | ○ | ○ | ○ | ○ |
| | Moisture permeability | g/(m² · 24 h) | 0.8 | 0.7 | 0.8 | 0.8 | 1.0 |
| | Cleanliness | per mL | 8 | 9 | 10 | 7 | 8 |

TABLE 7

|  |  | Units | Comparative Example 1 | Comparative Example 2 | Comparative Example 3 | Comparative Example 4 | Comparative Example 5 |
|---|---|---|---|---|---|---|---|
| Resin composition | Outer layer | — | X-5 | X-6 | X-2 | X-8 | X-9 |
|  | Intermediate layer | — | Y-1 | Y-1 | Y-1 | Y-1 | Y-1 |
|  | Inner layer | — | X-5 | X-1 | X-7 | X-1 | X-1 |
| Film properties | Molding stability | — | ○ | ○ | ○ | ○ | ○ |
|  | Surface smoothness | — | ○ | x | ○ | ○ | x |
|  | Appearance after sterilization treatment | — | 4 | 3 | 4 | 3 | 2 |
|  | Transparency Before sterilization treatment | % | 80 | 84 | 83 | 87 | 85 |
|  | After sterilization | % | 72 | 78 | 76 | 75 | 69 |
|  | Flexibility | — | x | ○ | x | ○ | ○ |
|  | Moisture permeability | g/(m² · 24 h) | 0.9 | 0.8 | 0.6 | 1.1 | 0.8 |
|  | Cleanliness | per mL | 7 | 7 | 6 | 8 | 7 |

|  |  | Units | Comparative Example 6 | Comparative Example 7 | Comparative Example 8 | Comparative Example 9 | Comparative Example 10 |
|---|---|---|---|---|---|---|---|
| Resin composition | Outer layer | — | X-1 | X-13 | X-14 | X-1 | X-1 |
|  | Intermediate layer | — | Y-1 | Y-1 | Y-1 | Y-8 | Y-9 |
|  | Inner layer | — | X-10 | X-13 | X-14 | X-1 | X-1 |
| Film properties | Molding stability | — | ○ | ○ | x | ○ | ○ |
|  | Surface smoothness | — | ○ | x | x | ○ | ○ |
|  | Appearance after sterilization treatment | — | 4 | 4 | 4 | 4 | 4 |
|  | Transparency Before sterilization treatment | % | 86 | 86 | 84 | 72 | 75 |
|  | After sterilization | % | 79 | 75 | 72 | 53 | 56 |
|  | Flexibility | — | ○ | ○ | x | x | x |
|  | Moisture permeability | g/(m² · 24 h) | 0.9 | 1.2 | 1.0 | 0.5 | 0.6 |
|  | Cleanliness | per mL | 12 | 13 | 11 | 8 | 7 |

The present invention has been described in detail with reference to specific embodiments, but, it is obvious for a person skilled in the art that various changes and modifications are possible without departing from the intention and the scope of the present invention.

All of the content of the specifications, scopes of patent claims, drawings, and abstracts of Japanese Patent Application No. 2013-213046 filed on Oct. 10, 2013 is cited here and incorporated as a disclosure of the specification of the present invention.

The invention claimed is:

1. A polyethylene resin composition comprising from 20 to 80 wt % of a high-density polyethylene (A) satisfying characteristics (a) and (b) described below, from 0 to 50 wt % of a linear low-density polyethylene (B1) satisfying characteristics (c) and (d) described below, and from 5 to 40 wt % of an ethylene-based polymer satisfying characteristics (e) to (h) described below, a total of (A), (B1), and (C) being 100 wt %:
   (a) Density is from 945 to 970 kg/m³;
   (b) MFR measured at 190° and load of 2.16 kg in conformance with JIS K69221 is from 0.1 to 15.0 g/10 min;
   (c) Density is from 890 to 915 kg/m³;
   (d) MFR measured at 190° and load of 2.16 kg in conformance with JIS K6922-1 is from 0.1 to 15.0 g/10 min;
   (e) Density is from 930 to 960 kg/m³;
   (f) MFR measured at 190° and load of 2.16 kg in conformance with JIS K6922-1 is from 0.1 to 15.0 g/10 min;
   (g) Two peaks appear in molecular weight measurement by gel permeation chromatography, and a ratio (Mw/Mn) of weight-average molecular weight (Mw) to number-average molecular weight (Mn) is from 2.0 to 7.0;
   (h) A fraction having Mn of not less than 100,000 obtained by molecular-weight fractionation has 0.15 or more long-chain branches per 1,000 carbons of a main chain.

2. The polyethylene resin composition according to claim 1, wherein the high-density polyethylene (A) satisfies characteristics (i) and (j) described below in addition to the characteristics (a) and (b):
   (i) A ratio (Mw/Mn) of weight-average molecular weight (Mw) to number-average molecular weight (Mn) determined by gel permeation chromatography is not greater than 3.0;
   (j) Residue according to the Residue on Ignition Test set forth in the Japanese Pharmacopoeia is not greater than 0.02 wt %.

3. The polyethylene resin composition according to claim 1, wherein the linear low-density polyethylene (B1) satisfies characteristics (k) and (l) described below in addition to the characteristics (c) and (d):
   (k) A ratio (Mw/Mn) of weight-average molecular weight (Mw) to number-average molecular weight (Mn) determined by gel permeation chromatography is not greater than 3.0;
   (l) An n-heptane extraction quantity at 50° C. is not greater than 1.5 wt %.

4. The polyethylene resin composition according to claim 1, wherein Mw/Mn of the ethylene-based polymer (C) is from 3.0 to 6.0, and Mn is not less than 15,000.

5. The polyethylene resin composition according to claim 1, wherein a proportion of components of the ethylene-based polymer (C), the proportion having Mn not less than 100,000 when fractioned by molecular weight, is less than 40% of all of the ethylene-based polymer (C).

6. The polyethylene resin composition according to claim 1, wherein the composition comprises from 20 to 70 wt % of the high-density polyethylene (A), from 10 to 50 wt % of the linear low-density polyethylene (B1), and from 5 to 40 wt % of the ethylene-based polymer (C).

7. A laminate containing an outer layer, an inner layer, and an intermediate layer disposed therebetween, the outer layer and the inner layer comprising the polyethylene resin composition described in claim 1, the intermediate layer comprising from 10 to 40 wt % of the high-density polyethylene (A) satisfying at least the above characteristics (a) and (b) and from 60 to 90 wt % of the linear low-density polyethylene (B1) satisfying he above characteristics (c) and (d), a total of (A) and (B1) being 100 wt %.

8. The laminate according to claim 7, wherein the high-density polyethylene (A) used in the intermediate layer satisfies the characteristics (a), (b), (i), and (j).

9. The laminate according to claim 7, wherein the linear low-density polyethylene (B1) used in the intermediate layer satisfies the characteristics (c), (d), (k), and (l).

10. The laminate according to claim 7, wherein the intermediate layer comprises a resin composition containing from 5 to 30 wt % of a linear low-density polyethylene (B2) satisfying characteristics (m) and (n) described below, relative to a total of 100 wt % of the high-density polyethylene (A) and the linear low-density polyethylene (B1):

(m) Density is from 920 to 945 kg/m$^3$;
(n) MFR is from 0.1 to 15.0 g/10 min.

11. A medical container possessing a holding portion holding a drug solution, at least the holding portion comprising the laminate described in claim 7.

12. The medical container according to claim 11, wherein the holding portion holding a drug solution is formed by molding a laminate molded in a film shape into a bag shape by hot sheet molding.

13. The medical container according to claim 11, wherein the holding portion holding a drug solution is formed by molding a laminate into a bottle shape by blow molding.

14. The medical container according to claim 11, wherein, even after sterilization treatment at 121° C., there is no deformation of the container and light transmittance measured at wavelength 450 nm in purified water is not less than 70%.

* * * * *